Oct. 4, 1932.  M. A. WECKERLY  1,880,562
WEIGHING SCALE
Filed March 18, 1931  3 Sheets-Sheet 1
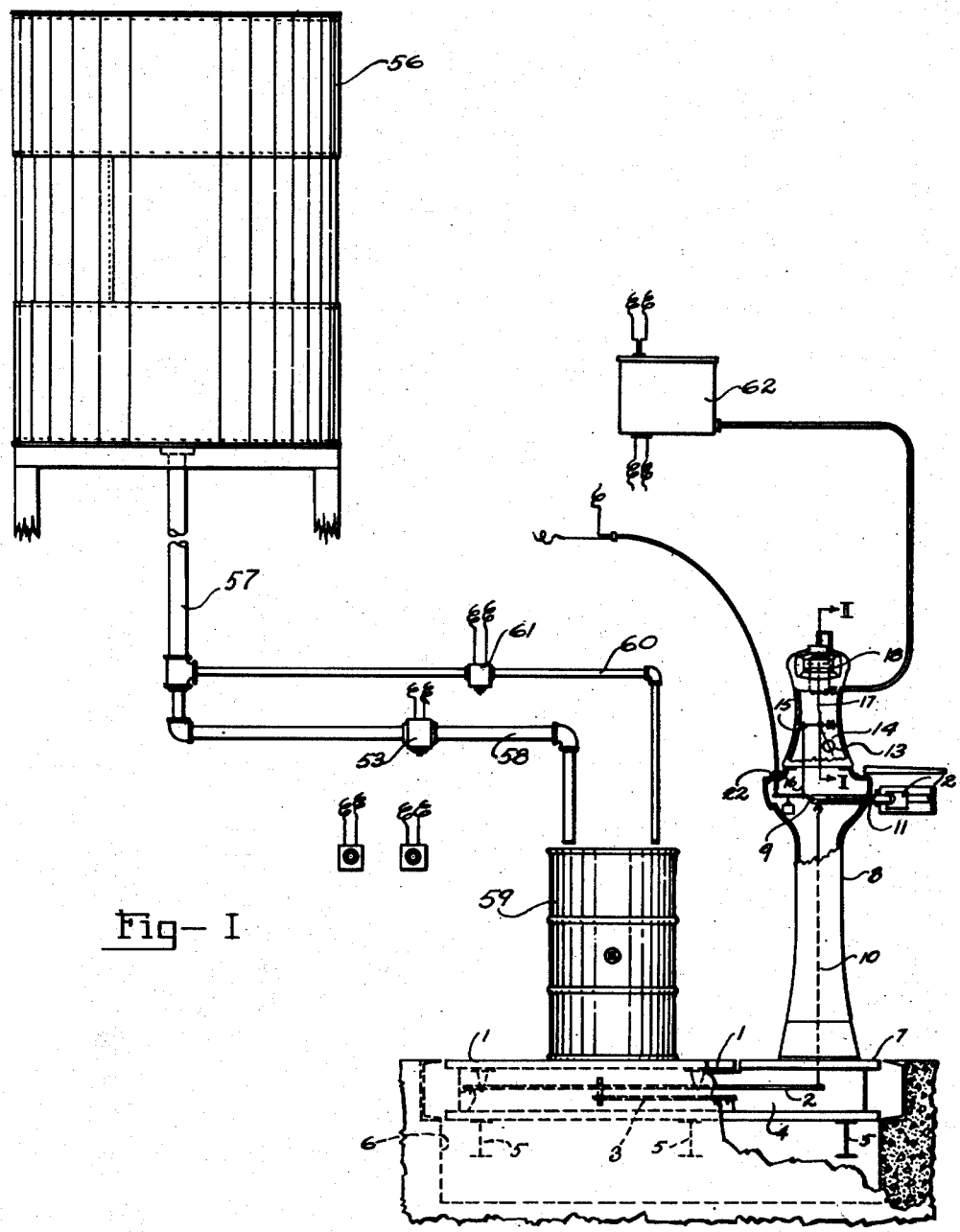
Fig-I
Mark A. Weckerly
INVENTOR
BY C M Marshall
ATTORNEY Oct. 4, 1932.  M. A. WECKERLY  1,880,562
WEIGHING SCALE
Filed March 18, 1931  3 Sheets-Sheet 2
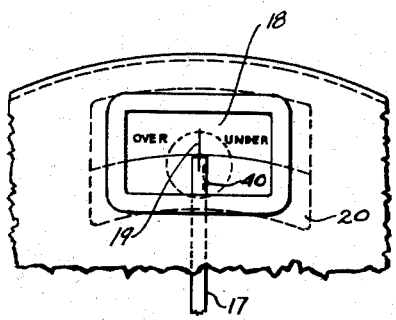
Fig-III
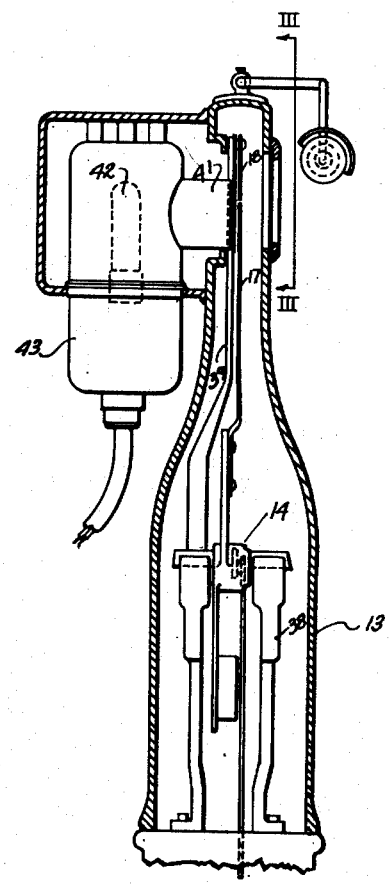
Fig-II
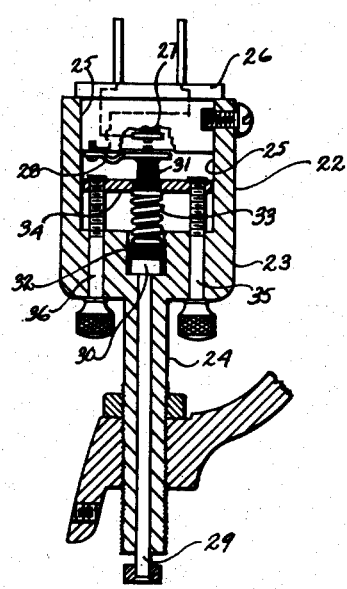
Fig-IV
Mark A. Weckerly
INVENTOR.
BY *CW Marshall*
ATTORNEY.

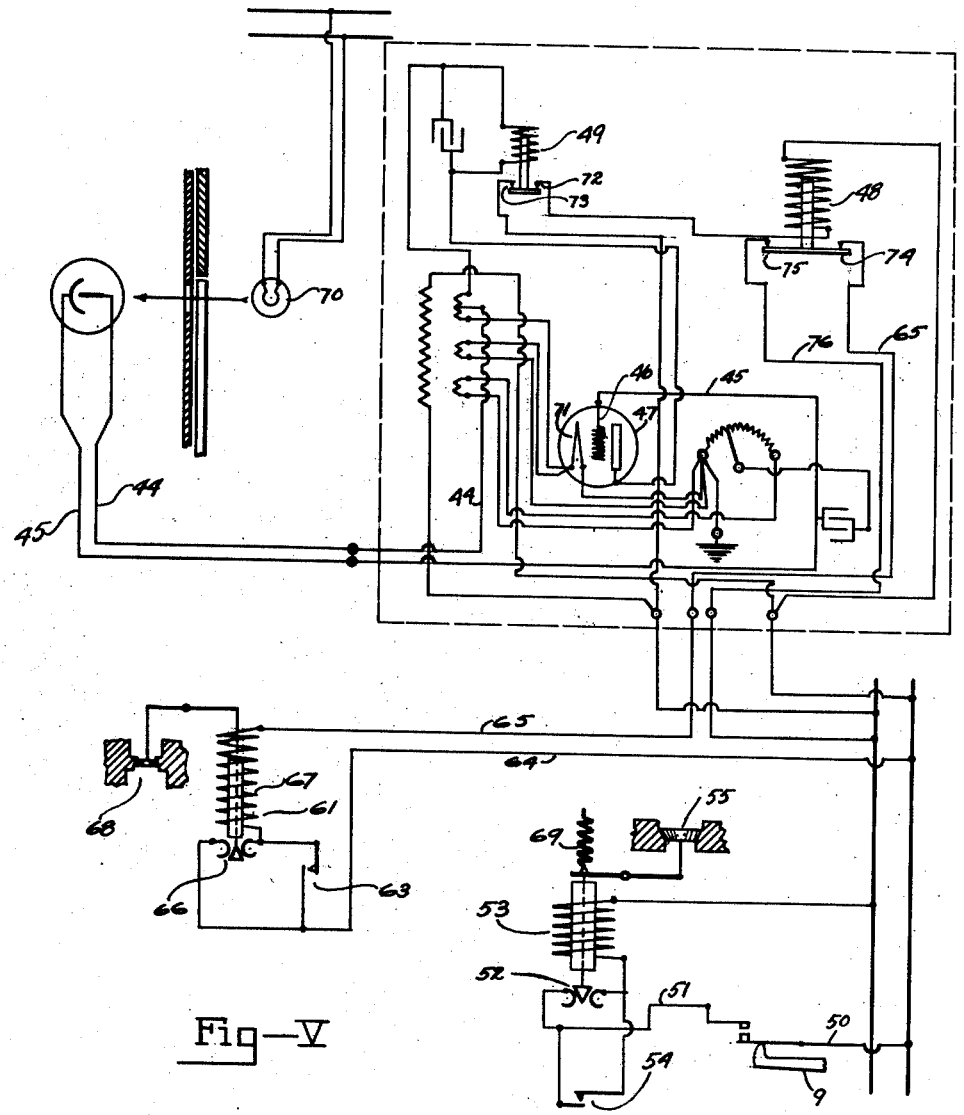

Patented Oct. 4, 1932

1,880,562

UNITED STATES PATENT OFFICE

MARK A. WECKERLY, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed March 18, 1931. Serial No. 523,460.

This invention relates to weighing scales and particularly to scales which are adapted to control material feeding mechanisms and automatically cut off the feed stream of such material when a predetermined amount has been deposited on the load receiver. It is well known in scales of this type to have two different material feed control devices operated by one scale, one of these devices being adapted to roughly cut off the stream when the predetermined amount has been nearly approached, the other control device allowing a fine or dribble stream to continue until the predetermined amount has been accurately determined. These cut-off devices are usually controlled by electrical switches which must be very delicately made so as not to have a reactive influence on the weighing mechanism. I have found that it is possible to utilize a switch for controlling the main material feeding stream that may have reactive influence, provided that it is used in combination with a dribble control switch which has no reactive influence. It is obvious that the accuracy of the load depends on the final increment deposited. It will also be readily seen that this will result in economies of manufacture as the switch for the main feed stream in this combination is less costly to make than the dribble feed switch and consequently the scales may be placed on the market at a lower price.

The principal object of this invention is the provision of an automatic weighing scale having means to control a plurality of material feed streams.

Another object of the invention is the provision of means in a weighing scale for controlling, by means of electrical switches, a plurality of electrical devices which may be stationed adjacent to or at a remote point from the weighing mechanism.

A further object in a scale for weighing predetermined weight loads is the provision of a mechanically operated electrical switch for co-operation with a ray actuated switch.

A still further object of the invention is the provision of means in a weighing scale for accurately determining a predetermined quantity of material by means of electrical devices in which the load is determined independently of devices which may have reactive influences on the weighing scale.

These and other objects will be apparent from the following description in which reference is had to the accompanying drawings and wherein similar reference numerals designate similar parts throughout the several views.

In the drawings:—

Figure I is a front elevational view, with parts broken away, of a scale and mechanism necessary to fulfill the objects primarily stated.

Figure II is an enlarged cross sectional view, sectioned along the lines II—II of Figure I, of the indicating mechanism and the position of the photo-electric cell controlling the ray operated switch.

Figure III is an enlarged fragmentary view seen along the line III—III of Figure II of the indicating and ray operated switch controlling means.

Figure IV is an enlarged cross sectional view of the mechanically operated control switch; and Figure V is a wiring diagram of the device.

Referring to the drawings in detail, the scale per se in which I have shown my invention embodied is fully described and illustrated in United States Patent 1,606,970 to E. G. Thomas and in this specification will describe it only so far as is necessary to properly disclose the present invention.

A platform or load receiver 1 rests by means of suitable bearings on the pivots on a load supporting lever system comprising a long main lever 2 and a short auxiliary lever 3. These levers (shown diagrammatically) are housed in a frame 4 which is adapted to rest upon supports 5 in a pit 6 so that the platform is flush with the surrounding floor. This frame is provided with a stationary deck 7 upon which a column 8 is fastened in which a counterbalancing beam lever 9 is pivotally mounted. A connecting rod 10 engaging the nose of the long lever 2 serves to transmit the force resulting from a load on the platform, to the lever 9 which is provided with a gradnated beam 11 upon which a load counterbalancing poise 12 is slidably stationed. An indicating housing 13 is mounted upon the column 8 and pivotally supports and houses a load counterbalancing pendulum 14 having an arm 15 which is pivotally connected with the load counterbalancing lever 9 by means of a connecting rod 16. To indicate, when the desired amount has been deposited on the load receiver, an indicator 17 which is fastened to the pendulum 13 co-operates with an indicia bearing chart 18 stationed in the upper part of the housing. This chart 18 is provided with a line 19 which is adapted to register with a similar line on the indicator 17 when the scale is in balance. Immediately in back of the chart 18 and the indicator 17 is a metallic screen 20 in which a narrow aperture is cut, in spaced relation with the line 19 on the chart 18 and with the indicator 17 when the line thereon is in registry with the line 19.

The scale thus far described is adapted to weigh predetermined amounts of material and to visually indicate when the required amount has been reached. When the scale is to control material feed streams or to control auxiliary devices, a make and break switch 22 is threaded through an aperture in a shoulder of the column 8. This switch consists of a body portion 23 which is provided with a turned and threaded stem 24. The body portion of this switch has a cavity 25 which is closed by a two pole cord connector plug 26 to which is fastened a stationary contact 27 and a light flexible contact 28. The flexible contact is so designed that when attached to the plug 26, the circuit is open. The plug body itself being made of insulating material, no further care need be taken to prevent short circuiting. As shown by the dotted lines in Figure IV, each of these contacts is connected to one of the poles of the plug. The stem 24 is tubular and a stem 29 is in the aperture. This stem has a head 30 situated in a counter-bore which is concentric with the aperture. A contact plunger 31 made of insulating material rests on the head 30 with an enlarged portion which forms a shoulder 32. The plunger 31 is surrounded by a spiral spring 33 which rests on the shoulder 32 and presses upwardly against a plate 34, and may be adjusted by the screws 35 and 36, threaded through apertures therein. The switch 22 is adapted to control the rough feed stream in a manner which will hereinafter be described in detail. For the purpose of controlling a dribble stream, a so-called photo-electric cell relay switch is provided which is controlled by the position of the indicator of the scale. In this disclosure the scale embodying the invention is shown controlling the weighing of predetermined amounts of liquid. It is to be understood, however, that the mechanism embodying the invention is adapted to operate gates or valves of any type for all suitable materials and is not restricted to the liquid cut-off valve shown.

It has been previously stated herein that the accuracy with which the weight of a load is determined by a device of the type described depends on the efficiency of the switch which controls the dribble stream. For this reason it is my intention to employ for it a light-sensitive or photo-electric cell relay switch. This type of switch is admirably suited for this work as in its operation there is no physical contact between it and any moving part of the scale.

Secured to the fulcrum stand 38 upon which the pendulum 14 is mounted, is an upwardly extending frame 39 to which is fastened to the screen 20 and the chart 18. The aperture 40 in the screen is directly in front of a tube 41 which forms a passage for rays to a photo-electric cell 42 stationed directly in back of the aperture 40 and housed in an enclosing box 43. Two leads 44 and 45 connect this cell to the secondary coil of a transformer and to the grid 46 of a thermionic valve 47 respectively which is included in the circuit to raise the potential of the current sufficiently so as to operate the magnetic operated relays 48 and 49.

The operation of the device may be understood from the following description. Let us assume that it is desired to fill a series of containers with oil or other liquids to a predetermined weight; in this example, let us assume 200 lbs. The first step in the operation is to determine the weight of the empty container and counter-balance this by a tare poise on a beam secured to the back of the lever 9 (not shown). The poise 12 on the beam 11 is set in the position where it will counterbalance 200 lbs. placed on the platform. This will overbalance the beam 9 and cause it to contact the plunger 29 which extends through the tubular stem 24 of the mechanically operated switch 22, forcing it and the contact plunger 31 in opposition to the pressure of the spring 33 against the contact 28 closing a circuit when the contacts 27 and 28 touch. The contact 28 is connected by a lead 50 to one side of an electrical source, and the contact 27 is connected by a lead 51 to one pole of a switch 52, the other side of which is connected to one end of the coil of a magnetic valve 53. The other end of the coil is connected to the other side of the source. The closing of the contacts 27 and 28, however, does not close the circuit of this magnetic valve as a parallel switch 54 is still open. This switch is manually operated. When the switch 54 is closed, the circuit feeding the coil of the magnetic valve 53 is energized and the solenoid action on the armature causes the switch 52 to close and the valve plunger 55 to open, allowing the liquid in the tank 56 to flow through the pipes 57 and 58 into the container 59 which is standing on the platform of the scale. The switch 54 is of the push button type and when the pressure is removed, the contacts are opened. The construction of the magnetic valve switch 52 is such that it remains closed as long as the coil is energized. This magnetic switch controls the valve which is adapted to cut off the main feed stream which is intended to fill the container to within a small percentage under the desired weight. The dribble stream of the material which flows through the pipes 57 and 60 is controlled by a magnetic valve 61 which is in series with the contacts of a system of relays which are enclosed in a box 62 and which in turn are controlled by the light sensitive or photoelectric element 42. The operation of this circuit is started by pressure on the push button switch 63 which causes a current to flow through the leads 64 and 65 attached to one of the poles of a magnetic hold-in switch 66 and to one end of the coil 67 of the magnetic valve 61. When this coil is energized, the armature closes the switch 66 and opens the valve plunger 68 allowing the liquid to flow.

The over-balanced lever 9 will remain in contact with the plunger 29 of the switch 22 until nearly the desired weight of the liquid has flowed into the container 59. The weight of this material then will overbalance the effect of the poise and cause the lever to move downwardly. The pressure of the spring 33 in the switch 22 will urge the contact plunger 31 until the contacts 27 and 28 are separated. When this is done, the current will cease to energize the coil of the magnetic valve 53 and the action of the spring 69 which is attached to the armature will close the valve plunger 55, and open the switch 52, thus effectively stopping any further flow of the liquid in the main feed stream.

When the poise 12 is moved to a position to counterbalance a load on the platform, the lever 9 to which the beam is attached is overbalanced and will assume an angular position. The load counterbalancing pendulum 14 which is connected to the lever by means of the connection 16 and arm 15 is also overbalanced, allowing the indicator fastened to the pendulum to move to the right of the indicating line, thus uncovering the aperture 40 in the screen 20, allowing the rays emanating from a source 70 placed in front of the housing 13 to strike the sensitive material of the photoelectric element. This lowers the effective resistance which in turn allows the amount of current from the source to increase in the circuit, causing a change in the potential between the grid 46 and the filament of tube 47 which causes a change in the flow of current from the plate 47 to the filament 71 of the thermionic tube 47. The flow of this current energizes the relay 49 bridging the contacts 72 and 73. This in turn causes the relay 48 to be energized and to bridge the contacts 74 and 75 allowing the current to flow through the leads 65 and 76 to the coil 67. When, as has been previously described, the lever 9, due to the action of the weight of the load on the platform, opens the switch 22, thus cutting off the flow of material by means of the valve 53, the indicator attached to the pendulum gradually approaches the balance indication on the chart 18 and when the predetermined load has been deposited in the container, the indicator 17 completely covers the aperture in the plate 20 preventing further light or other emanating rays from striking the sensitive material of the photoelectric element. This increases its resistance and stops to a great extent the flow of current therethrough, thus deenergizing the coils of the relays 48 and 49 and opening the contacts 74, 75 and 72, 73 and effectively breaking the circuit which energizes the coil 67 of the cut-off valve 61 closing the valve 68 and opening the switch 66, thus controlling the final or dribble material stream. As only a very small amount of material flows through the pipe controlled by this valve, it will be readily seen that the amount of material can be very accurately determined.

The foregoing description will make it obvious that the combination of a magnetically operated switch and a photo-electrc cell controlled switch which has no friction and therefore has no reactive influence is well suited to fulfill all the objects primarily stated. It is possible, however, that in place of a light sensitive cell, a cell which is sensitive to emanations which are beyond the visible spectrum may be employed. The use of such cells is desirable in some installations where it is objectionable to have a visible light. As the operation of such cells is similar to light sensitive cells, they may be used in combination with the circuit shown.

The embodiments of my invention herein shown and described are to be regarded as illustrative only, and it is to be understood that the invention is susceptible to variation, modification and change within the spirit and scope of the subjoined claims.

I claim:

1. In a weighing device, in combination, automatic load counterbalancing mechanism, material feeding means co-operating therewith, means for controlling said material feeding means controlled by said load counterbalancing mechanism, means for emitting an emanation cooperating with said load counterbalancing means, said material feed control means comprising a mechanically operated contact switch and a switch operated by the cooperation of said emitting means and said load counterbalancing mechanism.

2. In a weighing device, in combination, automatic load counterbalancing mechanism, material feeding means co-operating therewith, means for controlling said material feeding means controlled by said load counterbalancing mechanism, means for emitting an emanation cooperating with said load counterbalancing means, said material feed control means comprising a mechanically operated contact switch and a switch operated by the cooperation of said emitting means and said load counterbalancing mechanism, said emanation from said emitting means in the form of a ray.

3. In a weighing device, in combination, automatic load counterbalancing mechanism and material feeding means co-operating therewith, said material feeding means comprising a plurality of electrical devices adapted to regulate the flow of such material, an electrical switch for each of said devices, means for emitting a ray co-operating with said automatic load counterbalancing mechanism and one of said switches being operated by said load counterbalancing mechanism, the other said switch being operated by the cooperation of said load counterbalancing means and said ray emitting means.

4. In a weighing device, in combination, load counterbalancing mechanism comprising a plurality of members and an electrical material flow controlling device cooperating therewith, an electrical circuit and a circuit breaker adapted to be controlled by said load counterbalancing mechanism, said circuit breaker comprising a body and said body having a tubular stem adapted to be threaded into an aperture of one of said members of said counterbalancing mechanism.

5. In a weighing device, in combination, load receiving means, load counterbalancing mechanism, including a load offsetting lever, and indicating mechanism in cooperative relation and a plurality of means adapted to control electrical material feed controlling devices controlled by said indicating mechanism comprising a relatively movable chart and indicator, one of said plurality of means adapted to control said material feed control means comprising a photo-electric cell adapted to be controlled by the relative movement of said indicating mechanism and the other of said plurality of controlling means being controlled by said load offsetting lever.

6. In a weighing device, in combination, load counterbalancing mechanism and material feeding means cooperating therewith, said material feeding means comprising a plurality of electrical switches for controlling electrical devices including connecting electrical currents and one of said switches being adapted to break its circuit to control one of said devices, the other said switch, under control of said counterbalancing mechanism, increasing its resistance to an electrical current until the current drops below the required potential.

7. A device according to claim 6, characterized in that each of said devices have a push button switch for starting its cycle of operation.

MARK A. WECKERLY.